United States Patent
Woodbury et al.

(10) Patent No.: US 11,886,273 B2
(45) Date of Patent: Jan. 30, 2024

(54) POWER SOURCE DEVICES FOR POWER DELIVERY CONTRACT SELECTIONS

(71) Applicant: Hewlett-Packard Development Company, L.P., Spring, TX (US)

(72) Inventors: Christopher Woodbury, Spring, TX (US); Robert C. Brooks, Spring, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 71 days.

(21) Appl. No.: 17/419,774

(22) PCT Filed: Jul. 31, 2019

(86) PCT No.: PCT/US2019/044508
§ 371 (c)(1),
(2) Date: Jun. 30, 2021

(87) PCT Pub. No.: WO2021/021194
PCT Pub. Date: Feb. 4, 2021

(65) Prior Publication Data
US 2022/0155846 A1    May 19, 2022

(51) Int. Cl.
*G06F 1/26*    (2006.01)
*G06F 1/32*    (2019.01)
*G06F 1/3296*    (2019.01)

(52) U.S. Cl.
CPC .................. *G06F 1/3296* (2013.01)

(58) Field of Classification Search
CPC ..................................... G06F 1/3296
See application file for complete search history.

(56) References Cited

U.S. PATENT DOCUMENTS

| 8,904,217 | B2 | 12/2014 | Harris |
| 9,128,704 | B2 | 9/2015 | Kato et al. |
| 9,141,166 | B2 | 9/2015 | Sistla et al. |
| 9,151,818 | B2 | 10/2015 | Danesh et al. |
| 9,529,411 | B2 | 12/2016 | Waters et al. |
| 10,476,288 | B2 * | 11/2019 | Sultenfuss ............ H02J 7/0068 |
| 2008/0178032 | A1 | 7/2008 | Walrath |
| 2015/0046727 | A1 | 2/2015 | Kobayashi |
| 2015/0333526 | A1 | 11/2015 | Deng |
| 2017/0085183 | A1 * | 3/2017 | Notsch ..................... H02M 1/44 |
| 2017/0147052 | A1 | 5/2017 | Waters et al. |
| 2017/0185126 | A1 | 6/2017 | Trethewey |

(Continued)

FOREIGN PATENT DOCUMENTS

WO    2015/042329 A1    3/2015

*Primary Examiner* — Mohammed H Rehman
(74) *Attorney, Agent, or Firm* — QUARLES & BRADY LLP

(57) ABSTRACT

An example power source device includes a universal serial bus interface to couple to a power sink device, a power supply interface to couple to a power supply, a power measurement controller to measure a total power consumption of the power sink device and the power source device, a power contract manager to select a power delivery contract for the power sink device based on the total power consumption, a power supply rating of the power supply and a previous power delivery contract, and a power delivery controller to deliver power to the power sink device according to the selected power delivery contract.

18 Claims, 4 Drawing Sheets

(56) References Cited

U.S. PATENT DOCUMENTS

| | | | |
|---|---|---|---|
| 2017/0264144 A1* | 9/2017 | Park | H02J 50/40 |
| 2017/0293335 A1 | 10/2017 | Dunstan et al. | |
| 2018/0175636 A1 | 6/2018 | Choi | |
| 2018/0364779 A1 | 12/2018 | Shpiro | |
| 2018/0373289 A1 | 12/2018 | Sultenfuss et al. | |
| 2019/0074708 A1* | 3/2019 | Krishnakumar | H02J 7/04 |
| 2019/0138078 A1* | 5/2019 | Regupathy | G06F 1/3253 |

* cited by examiner

POWER SOURCE DEVICES FOR POWER DELIVERY CONTRACT SELECTIONS

BACKGROUND

Computing devices may be connected to docks and may act as power sink devices which draw power from a power source device (the docks). Power delivery contracts may be negotiated between a power source device and a power sink device based on deliverable power by the power source device, and usable power by the power sink device.

DETAILED DESCRIPTION

Computing devices, such as personal computers, laptops, desktops, or other types of computing devices, may be connected to docking devices, such as docking displays and retail point of sale items. In particular, they may be connected via universal serial bus (USB) interfaces capable of supporting power delivery protocols. Power delivery contracts may be negotiated based on available power from the power source device and the power demand by the power sink device. The total power consumption of the power used by the power source device and the power delivered to the power sink device may exceed a power supply rating of the power supply to the power source device. In some examples, power delivery may be negotiated to not exceed a threshold aggregate power consumption. Such power delivery may not optimize available power to both the power source device and the power sink device.

An example power source device includes a power measurement controller to monitor a total power consumption of the system, including both the power sink device and the power source device. The power source device also includes a power contract manager to provide a dynamic power delivery contract for the power sink device. The power delivery contract is dynamic based on the total power consumption, a power supply rating of a power supply of the system and a previous power delivery contract. For example, if the total power consumption exceeds the power supply rating, the power delivery contract will provide a lower power delivery offer to the power sink device. If the total power consumption is below the power supply rating, the power delivery contract may subsequently provide a higher power delivery offer to restore the power delivered to the power sink device. The power level balance between the power source device and the power sink device may thus be optimized according to the available power.

Figure 1:
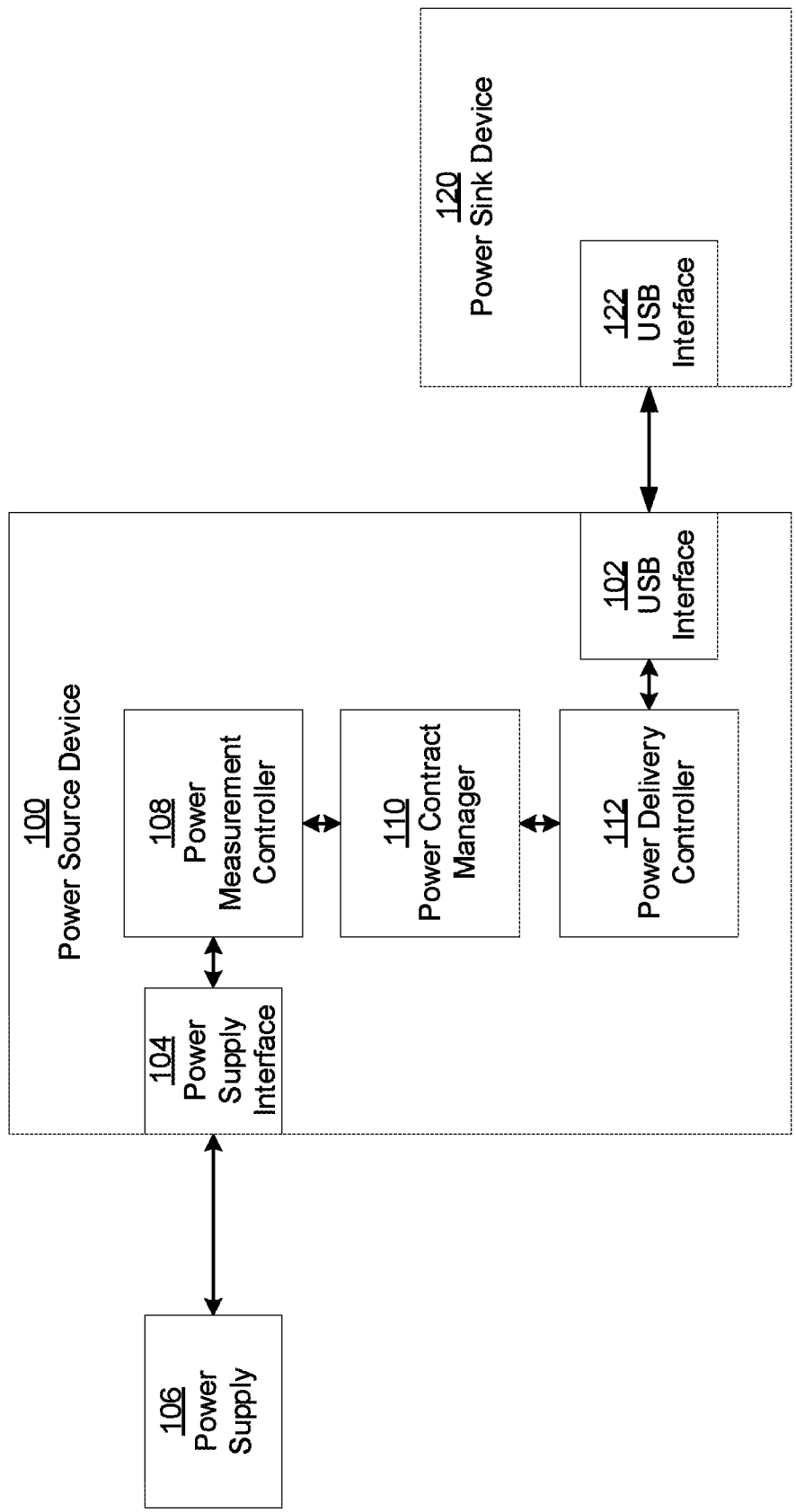
FIG. 1 depicts an example power source device for power delivery contract selections.

FIG. 1 shows a power source device 100. The power source device 100 includes a universal serial bus interface 102 to couple to a power sink device 120, a power supply interface 104 to couple to a power supply 106, a power measurement controller 108, a power contract manager 110, and a power delivery controller 112.

The power source device 100 may be, for example, a docking device, a docking display, or other suitable device which provides power to the power sink device 120. The power sink device 120 may be, for example, a notebook computer, desktop computer, a display device, or other device which receives power from the power source device 100.

The universal serial bus (USB) interface 102 is to couple to the power sink device 120 via a corresponding USB interface 122 of the power sink device 120. In particular, the USB interfaces 102 and 122 may be type C USB interfaces to allow power delivery protocols to be communicated between the power source device 100 and the power sink device 120.

The power supply interface 104 is to couple to the power supply 106, such as a power adapter, battery pack, or the like. The power supply interface 104 may further determine a power supply rating of the power supply 106. For example, the power supply rating may be 120 W, 150 W, or 180 W.

The power measurement controller 108 is interconnected with the power supply interface 104 to monitor a total power consumption of the system, including both the power source device 100 and the power sink device 120. In particular, the power measurement controller 108 may measure a current drawn by the system through the power supply interface 104. The power measurement controller 108 may be set statically to monitor the total power consumption of the system, for example, at predefined time intervals. In other examples, the power measurement controller 108 may be dynamically controlled, for example via an interface, such as an inter-integrated circuit, by the power contract manager 110.

The power contract manager 110 is interconnected with the power measurement controller 108 and the power supply interface 104. The power contract manager may include a central processing unit (CPU), a microcontroller, a microprocessor, a processing core, or similar device capable of executing instructions. The power contract manager 110 may also include a non-transitory machine-readable storage medium that may be electronic, magnetic, optical, or other physical storage device that stores executable instructions. The machine-readable instructions cause the power contract manager 110 to obtain a total power consumption from the power measurement controller 108, obtain the power supply rating from the power supply interface 104, and a previous power contract. The instructions further cause the power contract manager 110 to select a current power contract to provide to the power sink device based on the total power consumption, the power supply rating, and the previous power contract.

The power delivery controller 112 is interconnected with the USB interface 102. The power delivery controller 112 may include a central processing unit (CPU), a microcontroller, a microprocessor, a processing core, or similar device capable of executing instructions. The power delivery controller 112 may also include a non-transitory machine-readable storage medium that may be electronic, magnetic, optical, or other physical storage device that stores executable instructions. In particular, the instructions cause the power delivery controller to deliver power to the power sink device according to the selected power delivery contract.

Figure 2:
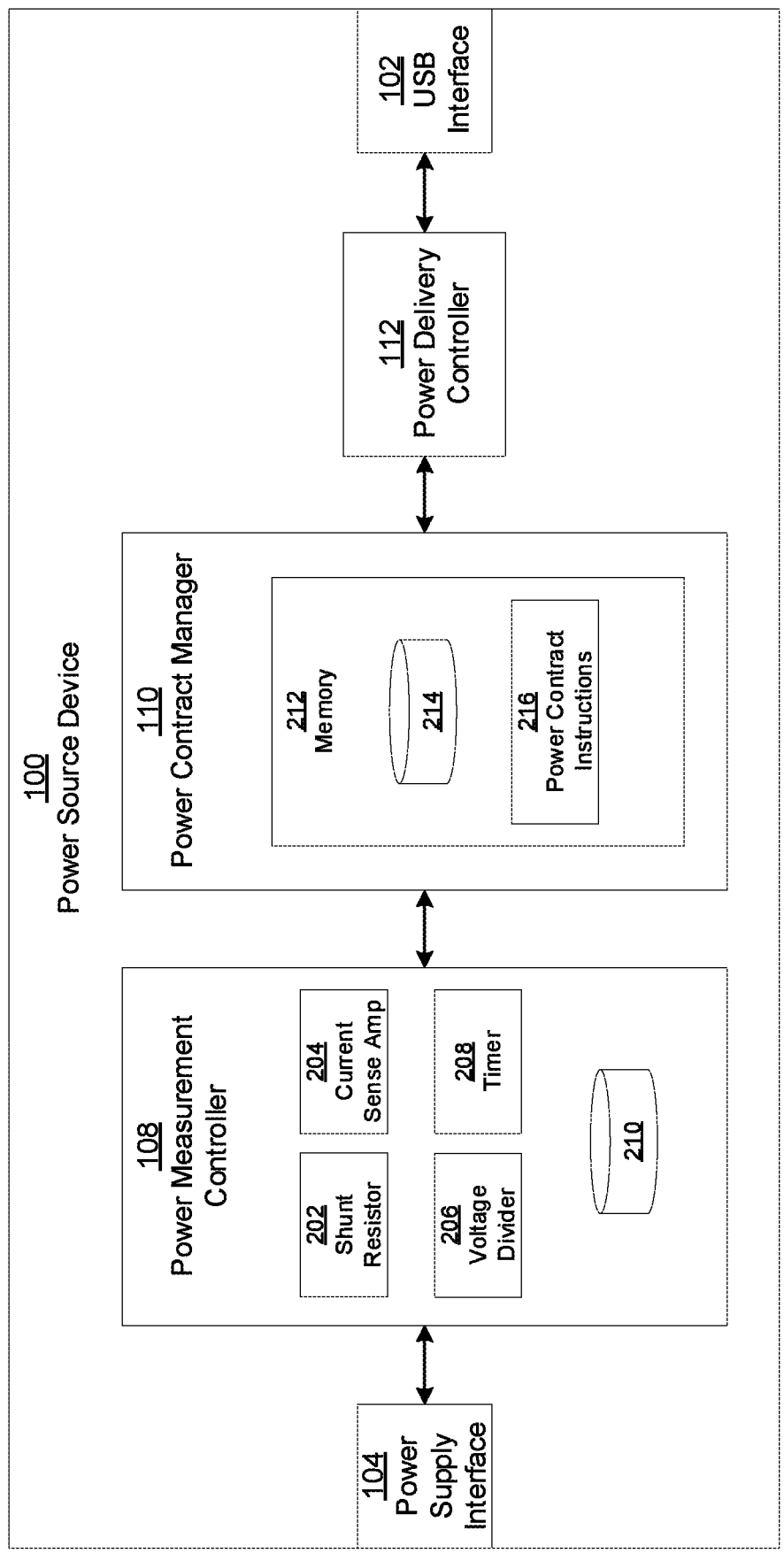
FIG. 2 depicts certain internal components of the power source device of FIG. 1.

FIG. 2 depicts a block diagram of certain internal components of the power source device 100 in greater detail.

The power measurement controller 108 includes a shunt resistor 202, a current sense amplifier 204, and a voltage divider 206. In particular, the shunt resistor 202 is coupled to the power supply interface 104 such that current drawn by the system (i.e., including both the power source device 100 and the power sink device 120) passes through the shunt resistor 202. The current sense amplifier 204 is coupled to the shunt resistor 202 to detect a voltage drop across the shunt resistor 202. The current sense amplifier 204 further amplifies the detected voltage drop and generates a voltage representation of the system's input current to the voltage divider 206. The voltage divider 206 scales the voltage representation according to a predefined power supply interpretation to provide the measured total power consumption of the system. In other examples, the components of the power measurement controller 108 may be integrated into a single current sense chip, a potentiometer, or other suitable device to measure current.

The power measurement controller 108 may further include a timer 208 to track when to measure the total power consumption. In particular, the power measurement controller 108 may measure the total power consumption at predefined intervals, as measured by the timer 208. Further, in some examples, the intervals at which the total power consumption is measured may be adjusted based on the power contracts or other factors. Such adjustments to the intervals may be tracked by the timer 208. In other examples, the power contract manger 110 may include a timer, and may control the power measurement controller 108 to measure the total power consumption.

The power measurement controller 108 may further include a power consumption repository 210. The power consumption repository 210 may store an association between a given time and the measured total power consumption at the given time. Further, the power consumption repository 210 may store period average total power consumptions. In particular, the power measurement controller 108 may measure the total power consumption at predefined intervals of time. Upon obtaining a threshold number of measurements of total power consumption, the power measurement controller 108 may determine a period average. For example, the power measurement controller 108 may obtain ten measurements of total power consumption at 50 millisecond (ms) intervals over a 500 ms period and determine a period average total power consumption. In other examples, the power measurement controller 108 may measure the total power consumption at different intervals or using a different threshold number of measurements of total power consumption.

The power measurement controller 108 may further compute and store a moving average total power consumption in the power consumption repository 210. In particular, after determining a period average, the power measurement controller 108 may store the period average in the power consumption repository 210. Upon obtaining a threshold number of period averages, the power measurement controller 108 may determine a moving average using the period averages. For example, the power measurement controller 108 may obtain ten period averages and determine a moving average of the period averages. In other examples, the power measurement controller 108 may determine the moving average after a different threshold number of period averages. For example, the power measurement controller 108 may utilize any number of period averages to determine the moving average, to a maximum of ten period averages. In particular, the thresholds may be set based on different events or states (e.g., based on the current power contract, a forced power change request from the power sink device, a power supply with a specific power supply rating, or the like).

The power contract manager 110 includes a machine-readable storage medium such as a memory 212. The memory 212 may store a power contract repository 214. The power contract repository 214 stores a record of power contracts provided to the power sink device 120. Each power contract record may include attributes of the power contract, such as power value of the power contract, the relative change in the power contract (e.g., higher, lower, or the same as the previous power contract), and the like.

The memory 212 further includes power contract instructions 216. The power contract instructions 216, when executed, cause the power contract manager 110 to select a power contract to provide to the power sink device 120 based on a total power consumption obtained from the power measurement controller 108, a power supply rating of the power supply 106, and a previous power contract obtained from the power contract repository 214.

Figure 3:
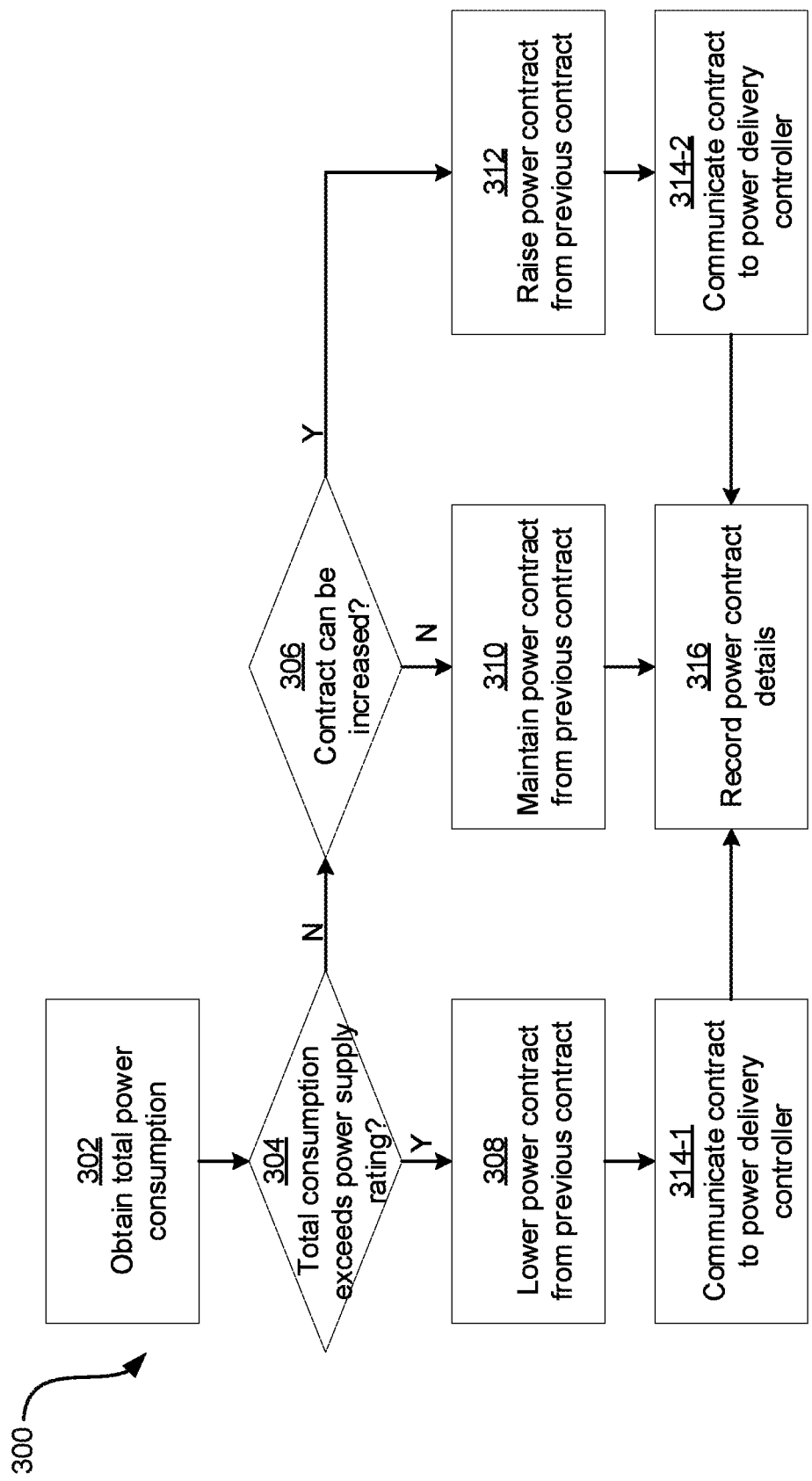
FIG. 3 depicts a flowchart of an example method for selecting power delivery contracts.

FIG. 3 depicts a flowchart of an example method 300 of selecting a power contract to provide to a power sink device. The method 300 is described in conjunction with its performance by the power source device 100, and in particular, the power contract manager 110 via execution of the power contract instructions 216. In other examples, the method 300 may be performed by other suitable devices or systems.

The method 300 is initiated at block 302. The method 300 may be initiated, for example, in response to the power measurement controller 108 obtaining a new total power measurement. At block 302, the power contract manager 110 obtains the total power consumption from the power measurement controller 108. The total power consumption obtained may be, for example the total power consumption at a particular instant in time, a period average, or a moving average. For example, the power contract manager 110 may obtain the period average to reduce the impact of outlier power consumption values, such as short current spikes. In other examples, the power contract manager 110 may obtain the moving average to reduce a speed of change of the power contracts. In still further examples, the power contract manager 110 may obtain both the period average and the moving average.

At block 304, the power contract manager 110 determines whether the total power consumption obtained at block 302 exceeds the power supply rating determined by the power supply interface 104.

If the total power consumption exceeds the power supply rating, the method 300 proceeds to block 308. At block 308, the power contract manager 110 obtains the previous power contract from the power contract repository and selects a power contract with a lower power value than that of the previous power contract (i.e., lowers the power contract). In some examples, the power contracts may have predefined power values which may be offered. For example, the power contracts may be offered at 10 W intervals up to a maximum power rating of the USB interfaces 102 and 122. Accordingly, the power contract manager 110 may simply select the next highest power contract relative to the previous power contract. In other examples, the power contract manager 110 may lower the power contract by decrementing the power value based on the total power consumption and the previous power contract.

For example, the power contract manager 110 may consider the period average and the moving average. For example, if the total power consumption as computed using either the period average or the moving average exceeds the power supply rating, the power contract manager 110 may lower the power contract in 10 W increments. If the total power consumption as computed using the period average exceeds the power supply rating, and the total power consumption as computed using the moving average does not exceed the power supply rating, the power contract manager 110 may lower the power contract in 5 W increments. In still further examples, the power contract manager 110 may further consider the power value of the previous power contract. For example, if the power value is above a threshold value, the power contract manager 110 may lower the power contract in 10 W increments. If the power value is below the threshold value, the power contract manager 110 may lower the power contract in 5 W increments. The power contract manager 110 may thus dynamically lower the power contracts in consideration of previous power values and previous total power consumption.

If, at block 304, the total power consumption does not exceed the power supply rating, the method 300 proceeds to block 306. At block 306, the power contract manager 110 determines whether a power contract having a higher power value may be selected. In particular, the power contract manager 110 may consider a maximum deliverable power, the relative change of the previous power contract, and the like.

For example, the USB interfaces 102 and 122 may have a maximum deliverable power (e.g., 100 W) which may be delivered from the power source device 100 to the power sink device 120. Accordingly, if the previous power contract has a power value equal to the maximum deliverable power, the power contract may not be increased. The power contract manager 110 may further consider the relative change of the previous power contract. For example, the power contract manager 110 may only increase the power contract if the previous power contract did not decrease relative to its preceding power contract. The power contract manager 110 may thus slow the rate of restoring the power delivered to the power sink device 120 to not overburden the power supply 106.

If, at block 306, the power contract may not be increased, the method 300 proceeds to block 310. At block 310, the power contract manager 110 maintains the power contract. In particular, the method 300 may proceed directly to block 316, without communicating a new power contract to the power delivery controller 112 to negotiate with the power sink device 120.

If, at block 306, the power contract may be increased, the method 300 proceeds to block 312. At block 312, the power contract manager 110 increases the power contract relative to the previous power contract. In particular, the power contract manager may increase the power contract by selecting the power delivery contract from predefined power delivery contracts. Accordingly, the power contract manager may select the next lowest power contract relative to the previous power contract. In other examples, the power contract manager 110 may increase the power contract by incrementing the power value.

For example, the power contract manager 110 may consider the period average and the moving average. For example, if the total power consumptions as computed using the period average and the moving average are both below the power supply rating, the power contract manager 110 may increase the power contract in 10 W increments. If the total power consumption as computed using the period average is below the power supply rating, and the total power consumption as computed using the moving average exceeds the power supply rating, the power contract manager 110 may increase the power contract in 5 W increments.

In further examples, the power contract manager 110 may further consider the power value of the previous power contract. For example, if the power value is above a threshold value, the power contract manager 110 increase the power contract in 10 W increments. If the power value is below the threshold value, the power contract manager 110 may increase the power contract in 5 W increments. In still further examples, the power contract manager 110 may consider the relative change in the previous power contract. For example, if the previous power contract was maintained from its preceding power contract, the power contract manager 110 may increase the power contract in 5 W increments. If the previous power contract was increased from its preceding power contract, the power contract manager 110 may increase the power contract in 10 W increments. The power contract manager 110 may thus dynamically increase the power contracts in consideration of previous power contracts and previous total power consumption.

For example, Table 1 depicts an example scenario of dynamic power contract offerings. In the present example, the power supply rating is 120 W and the maximum deliverable power to the power sink device is 100 W.

TABLE 1

Dynamic Power Contract Offerings

| Time | Total Power Consumption | Previous Power Contract | Selected New Power Contract |
|---|---|---|---|
| 5 | 118 W | 100 W | — |
| 10 | 130 W | 100 W | 90 W |
| 15 | 130 W | 90 W | 80 W |
| 20 | 123 W | 80 W | 70 W |
| 25 | 111 W | 70 W | — |
| 30 | 113 W | 70 W | 75 W |

At time 5, the total power consumption does not exceed the power supply rating and the power contract cannot be increased. Accordingly, no new power contract is selected, and the current power contract of 100 W is maintained. At times 10-20, the total power consumption exceeds the power supply rating, so the power contracts are lowered in 10 W increments. At time 25, the total power consumption does not exceed the power supply rating. The power contract may be increased based on deliverable power and may not be increased based on the relative change of the previous power contract. In particular, since the previous power contract was lowered (from 80 W to 70 W), the power contract manager may implement a slower power restoration to not overburden the power supply. Accordingly, no new power contract is selected, and the current power contract of 70 W is maintained. At time 30, the total power consumption does not exceed the power supply rating, and the power contract may be increased. In particular, the power contract manager may implement a slower power restoration and may select a new power contract in 5 W increments rather than 10 W increments.

At blocks 314-1 and 314-2, the power contract manager 110 communicates the newly selected power contract to the power delivery controller 112 to provide to the power sink device 120.

At block 316, the power contract manager 110 records the power contract details in the power contract repository. In particular, the power contract manager 110 records the power value, the relative change, and other relevant attributes of the power contract. In some examples, the power contract manager 110 may further communicate with the timer 208 of the power measurement controller 108 to change the intervals at which total power consumption is measured. For example, when the power contract is below a threshold value, the power measurement controller 108 may decrease the intervals at which total power consumption is measured to allow a quicker response to increase the power contracts offered to the power sink device 120.

Figure 4:
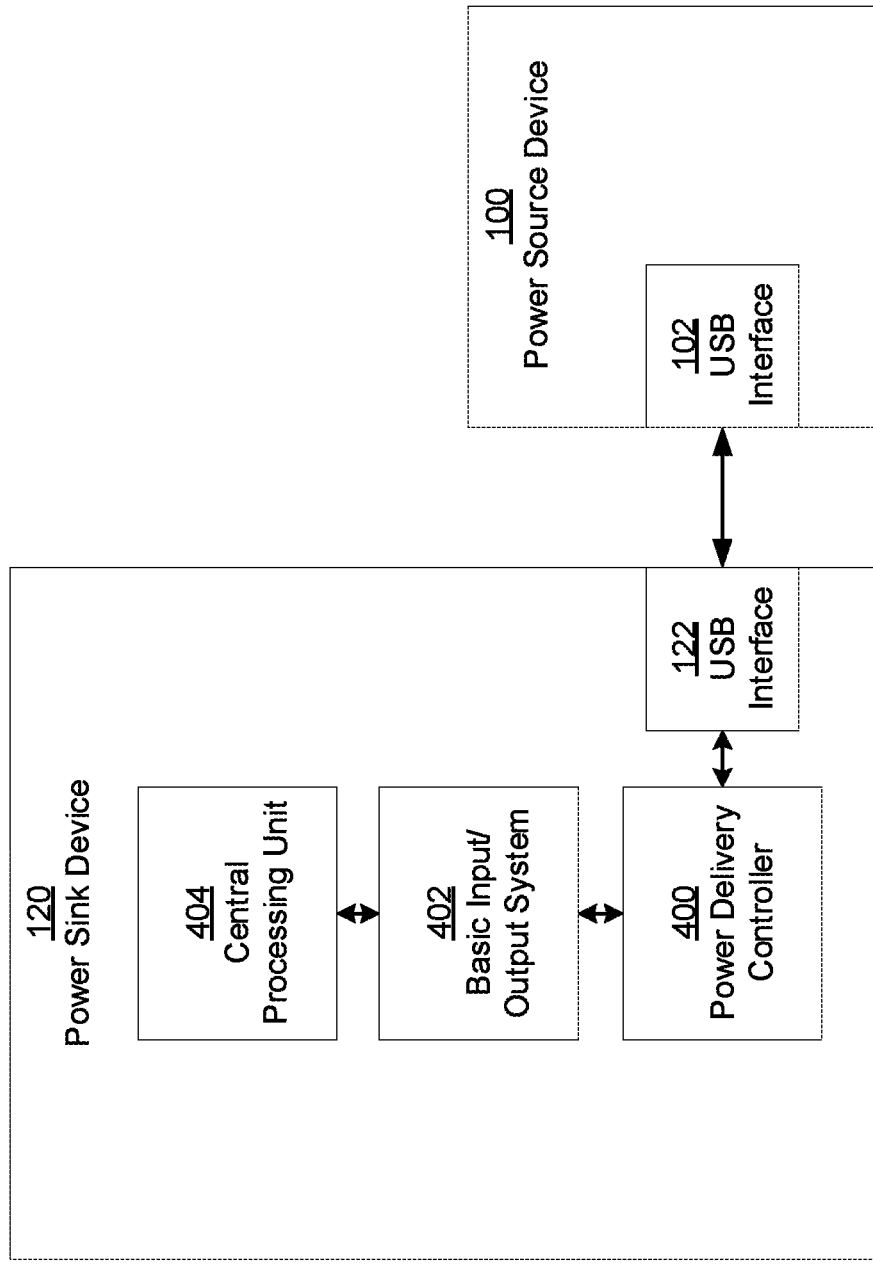
FIG. 4 depicts an example power sink device to manage power consumption according to a power delivery contract.

FIG. 4 depicts certain internal components of the power sink device 120 in greater detail.

The power sink device 120 includes the universal serial bus interface 122, a power delivery controller 400, a basic input/output system 402 and a central processing unit 404.

The power delivery controller 400 is interconnected with the USB interface 122. The power delivery controller 400 is to receive the power delivery contract from the power source device 120 via the USB interface 122.

The basic input/output system (BIOS) 402 is interconnected with the power delivery controller 400 and the CPU 404 and configures the power sink device 120 to manage power consumed by the power sink device 120 according to the received power delivery contract. In particular, the BIOS 402 sets a high threshold, a low threshold and a processor power limit based on the power delivery contract. The BIOS 402 further monitors a system power level. When the system power level exceeds the high threshold, the BIOS 402 is to limit a power consumption of the CPU 404 to the processor power limit. When the system power level is reduced to below the low threshold, the BIOS 402 releases the power consumption of the CPU 404 from the imposed processor power limit. That is, the BIOS 402 allows the CPU 404 to resume normal power consumption.

If the power delivery contract is below a contract threshold, the BIOS 402 may further disable power consumption activities. For example, the BIOS 402 may disable USB charging ports which provide charging capabilities to external peripheral devices. In some examples, the BIOS 402 may further track an intermediary contract threshold, in which power consumption activities are reduced, but not disabled. Further, in some examples, if the power delivery contract is below a power threshold, the BIOS 402 may shut down the power sink device 120.

As described above, a power source device includes a power measurement controller to monitor a total power consumption of the system, including both the power sink device and the power source device. The power source device also includes a power contract manager to select a dynamic power delivery contract for the power sink device. The selected power delivery contract is dynamic based on the total power consumption, a power supply rating of a power supply of the system and a previous power delivery contract. The power contract manager may further affect the timing of subsequent power contract selections, as well as the incremental changes of the power contract selections. The power level balance between the power source device and the power sink device may thus be optimized according to the available power, while not overburdening the power supply.

The scope of the claims should not be limited by the above examples, but should be given the broadest interpretation consistent with the description as a whole.

The invention claimed is:

1. A power sink device comprising:
a universal serial bus interface to couple to a power source device;
a power delivery controller interconnected with the universal serial bus interface, the power delivery controller to receive a power delivery contract defining power delivered to the power sink device; and
a basic input/output system to:
update a high threshold and a processor power limit based on the power delivery contract; and
when a system power level exceeds the high threshold, limit a power consumption of a central processing unit to the processor power limit.

2. The power sink device of claim 1, wherein the basic input/output system is further to:
update a low threshold based on the power delivery contract; and
when the system power level is below the low threshold, release the power consumption of the central processing unit from the processor power limit.

3. The power sink device of claim 1, wherein the basic input/output system is further to disable universal serial bus charging ports when the power delivery contract is below a contract threshold.

4. The power sink device of claim 1, wherein the basic input/output system is further to shut down the power sink device when the power delivery contract is below a power threshold.

5. A power source device comprising:
a first interface to receive, when the first interface is electrically coupled to a power supply, power from the power supply;
a second interface to output, when the second interface is electrically coupled to a power sink device, power contracts to the power sink device;
a power measurement controller to measure, when the second interface outputs a previous one of the power contracts, a total amount of the power consumed by a system comprised of the power sink device and the power source device; and
a power contract manager to ascertain, when the power contract manager determines whether or not the total amount exceeds a power supply rating of the power source device, a power value for a subsequent one of the power contracts,
wherein the power value for the subsequent one of the power contracts, when the power contract manager determines that the total amount exceeds the power supply rating, is lower than a power value for the previous one of the power contracts.

6. The power source device of claim 5, wherein the second interface is to output the previous one of the power contracts before outputting the subsequent one of the power contracts.

7. The power source device of claim 5, wherein the power value quantifies a percentage of the power that is deliverable from the second interface to the power sink device.

8. The power source device of claim 5, wherein the power value for the subsequent one of the power contracts, when the power contract manager determines that the total amount is below the power supply rating, is higher than a power value for the previous one of the power contracts.

9. The power source device of claim 5, wherein the first interface is to determine the power supply rating.

10. The power source device of claim 5, wherein the power measurement controller comprises:
a shunt resistor through which current drawn by the power sink device and the power source device passes;
a current sense amplifier to detect a voltage drop across the shunt resistor and amplify the detected voltage drop to generate a voltage representation; and
a voltage divider circuit to scale the voltage representation according to a predefined power supply interpretation to provide the total power consumption of the power sink device and the power source device.

11. The power source device of claim 5, wherein the power measurement controller is to measure the total power consumption at predefined intervals.

12. The power source device of claim 11, wherein the power contract manager is to update the predefined intervals based on the subsequent one of the power contracts.

13. A non-transitory machine-readable storage medium storing machine-readable instructions, wherein a power source device receives power from a power supply and outputs power contracts to a power sink device,
the instructions which when executed by a processor, cause the power source device to:
obtain, when the power source device outputs a previous one of the power contracts, a total amount of the power consumed by a system comprised of the power sink device and the power source device; and
ascertain, when the power source device determines whether or not the total amount exceeds a power supply rating of the power source device, a power value for a subsequent one of the power contracts,
wherein the power value for the subsequent one of the power contracts, when the power source device determines that the total amount exceeds the power supply rating, is lower than a power value for the previous one of the power contracts.

14. The non-transitory machine-readable storage medium of claim 13, wherein the power value for the subsequent one of the power contracts defines, when the power source device outputs the subsequent one of the power contracts, a percentage of the delivered from the power to the power sink device.

15. The non-transitory machine-readable storage medium of claim 13, wherein the second interface is to output the previous one of the power contracts before outputting the subsequent one of the power contracts.

16. The non-transitory machine-readable storage medium of claim 13, wherein the power value quantifies a percentage of the power that is deliverable from the second interface to the power sink device.

17. The non-transitory machine-readable storage medium of claim 13, wherein the power value for the subsequent one of the power contracts, when the power source device determines that the total amount is below the power supply rating, is higher than a power value for the previous one of the power contracts.

18. The non-transitory machine-readable storage medium of claim 13, wherein the power source device determines the power supply rating.

* * * * *